United States Patent Office 3,089,820
Patented May 14, 1963

3,089,820
METHOD OF INCREASING BLOOD CLOTTING TIME WITH A LIVER LIPID
Joseph P. Dailey, Kankakee, and Robert L. Colescott, Bourbonnais, Ill., assignors, by mesne assignments, to Armour Pharmaceutical Company, a corporation of Delaware
No Drawing. Filed May 11, 1959, Ser. No. 812,115
1 Claim. (Cl. 167—74.6)

This invention relates to an anti-thromboplastic lipid derived from mammalian liver tissue and to the preparation of such lipid.

This lipid, which is derived from mammalian liver tissue, can be characterized chemically by being soluble in water and heptane and insoluble in ethanol, methanol, acetone and a mixture of one part of heptane and three parts of acetone. Also, this lipid can be characterized analytically by being substantially free from thromboplastic activity, by prolonging human and animal whole blood clotting time in vitro, by prolonging recalcified plasma clotting time, by preventing thromboplastin generation in vitro, and by counteracting the thromboplastic activity of platelet and brain thromboplastin in the recalcified plasma and thromboplastin generation analyses. Further, this lipid can be characterized biologically by being substantially non-toxic on oral and intravenous administration, and upon intravenous injection into rabbits, by prolonging whole blood clotting time.

Although the special lipid of this invention has as yet been incompletely characterized on a structural basis, it is believed to be a phospholipid, and may be an arachadonic acid-containing phospholipid.

The lipid of this invention may be obtained by a process which involves extracting substantially dehydrated, ground mammalian liver tissue with a non-polar solvent to obtain a lipid extract thereof. The starting material for this process can be any mammalian liver tissue, but better results may be achieved with beef or pork liver tissue, and especially desirable as a starting material is beef liver tissue. It has been found to be important in the preparation of this special lipid that the liver tissue during extraction with the lipid solvent should be substantially dry. Accordingly, prior to extraction, the hashed or comminuted liver tissue may be evaporated to substantial dryness.

The non-polar solvent employed in this extraction may be for example, xylene, benzene, chloroform, heptane, cyclohexane, hexane, pentane or tetrahydrofuran. However, better results are obtained when extraction of the lipid is carried out with heptane.

After extraction of the lipid has been completed, the resulting solvent extract may be separated from the tissue residue by, for example, centrifugation or filtration.

Then, the separated solvent extract may be subjected to evaporation to obtain concentration of the solids therein.

Thereafter, the lipid may be precipitated with, for example, acetone, methanol, or ethanol. This precipitate, after separation from the supernatant liquid, may be dehydrated to obtain a dry lipid product which demonstrates the foregoing chemical, analytical and biological properties.

Also, as disclosed in the co-pending patent application of J. P. Dailey, Serial No. 705,142, filed December 26, 1957, there is obtained by the administration of this lipid to human beings lowering of the serum cholesterol level.

This invention is further described and elucidated in the following specific examples.

Example I

The following process has been employed in the preparation of a lipid which demonstrates significant prolongation of whole blood clotting time.

Liver meal, which is substantially dehydrated, ground pork or beef liver tissue, in the amount of 1000 gms., was combined with 1500 cc. of heptane. The resulting mixture was stirred at a temperature of 50° C. for a period of one hour. The resulting heptane extract was separated from the tissue residue by filtration. To the separated tissue residue was added 1000 cc. of heptane, and the resulting mixture was stirred at a temperature of 50° C. for a period of one and one-half hours. Again, the heptane extract was separated from the tissue residue. This tissue residue was washed with 500 cc. of heptane.

The two separated heptane extracts and the heptane wash were combined. The resulting heptane solution was subjected to evaporation under vacuum in a water bath having a temperature of about 50° C. to obtain concentration thereof to about 65 gms. of solids per 100 cc. of solution.

The resulting heptane concentrate was poured into acetone, with vigorous agitation, one part of the heptane concentrate being combined with three parts of acetone. The resulting oily precipitate was separated from the superatant liquid by decantation, and the separated precipitate was washed with acetone, collected on a Büchner funnel, and dried under vacuum. The yield of dry lipid was 46 gms.

Elemental analysis of this lipid indicated 3.48% of phosphorous and 1.84% of nitrogen. This dry product was soluble in water, heptane and chloroform, and insoluble in acetone, methanol and ethanol.

This dry lipid demonstrated significant prolongation of whole blood clotting time.

Example II

The following method was employed in preparing a lipid which demonstrated significant prolongation of whole blood clotting time.

Liver meal, which is substantially dehydrated, ground beef or pork liver tissue, in the amount of 1000 gms., was combined with 1500 cc. of heptane, and the resulting mixture was stirred at a temperature of 50° C. for a period of one hour. The resulting heptane extract was separated from the tissue residue by filtration. To the separated tissue residue was added 1000 cc. of heptane, and the resulting mixture was stirred at a temperature of 50° C. for a period of one and one-half hours. Again, the heptane extract was separated from the tissue residue, and the separated tissue residue was washed with 500 ml. of heptane.

The two heptane extracts and the heptane wash were combined. The resulting heptane solution was subjected to distillation under reduced pressure to obtain complete removal of the heptane. This "total liver lipid preparation," amounting to 110 gms., was combined with 1000 cc. of anhydrous denatured alcohol, and the resulting mixture was stirred for a period of one hour at room temperature. The precipitate thereupon formed was collected on a Büchner funnel, washed with acetone, and dried under vacuum. The dry lipid was obtained in a yield of 13.7 gms.

Elemental analysis of this lipid indicated 3.83% of phosphorous and 2.33% of nitrogen. The dry product was soluble in water, and insoluble in acetone, methanol and ethanol.

This dry lipid demonstrated significant prolongation of whole blood clotting time.

*Example III*

The alcohol filtrate obtained by the process of Example II was subjected to distillation under reduced pressure to remove approximately one-half of the alcohol therein. The resulting concentrate was chilled and maintained at a temperature of 5° C. for a period of two hours. The precipitate thereupon formed was collected on a Büchner funnel, washed with acetone, and dried under vacuum. The yield of dry lipid was 13.3 gms. This dry lipid demonstrated significant prolongation of whole blood clotting time, and thus there was provided by this step an increased yield over that obtained in the method of Example II.

*Example IV*

The following method may be employed to obtain separation of further contaminants from the lipid of this invention.

A "total liver lipid preparation" obtained by the method of Example II, in the amount of 165 gms., was combined with 532 cc. of absolute ethanol, with vigorous agitation, and the resulting mixture was maintained at room temperature for a period of three hours. Thereafter, the ethanol extract was separated from the lipid residue by centrifugation or filtration. To the resulting filtrate was added 76 cc. of absolute ethanol, and the resulting mixture was maintained at room temperature for a period of three hours. Then, the supernatant liquid was separated from the lipid residue by filtration. To the resulting filtrate was added 640 ml. of absolute ethanol, and the resulting mixture was maintained at room temperature for a period of 16 hours.

The precipitate thereupon formed was collected on a Büchner funnel, washed with acetone, and dried under vacuum. This dry product was obtained in a yield of 13 gms.

Elemental analysis of this lipid indicated 3.38% of phosphorous and 2.11% of nitrogen. The dry product was soluble in water, and insoluble in acetone, methanol and ethanol.

This dry lipid demonstrated significant prolongation of whole blood clotting time.

*Example V*

The following analytical procedure has been employed in characterizing the lipid of this invention in prolonging recalcified plasma clotting time.

Rabbit blood, in the amount of 20 cc., was drawn into a syringe containing 0.4 cc. of a 19% aqueous sodium citrate solution. After centrifugation for a period of ten minutes at 1500 r.p.m., the plasma thereof was drawn off with a pipette.

To this citrated plasma, in the amount of 0.16 cc., in a siliconized glass test tube having dimensions of 12 x 75 mm., is added 0.23 cc. of a 5% aqueous dextrose solution containing the material to be tested. Then, the tube is immersed in a water bath at a temperature of 37° C., and there is added 0.16 cc. of 0.02 M calcium chloride solution. At the time of adding the calcium chloride a stop watch is started.

The test tube is tilted in the water bath every 30 seconds, and when a clot has formed in the test tube the time is recorded.

For example, in employing this recalcified plasma analysis, when a blank was run the clotting time was 150 seconds. On the other hand, when 57.5 mcg. of the lipid obtained by the method of Example II was subjected to analysis the clotting time was 450 seconds.

Further, when a lipid derived from substantially dry, ground mammalian brain tissue, such as beef brain tissue, by the method of Example II was subjected to analysis by this procedure the clotting time was 90 seconds.

Consequently, these results demonstrate that the lipid of this invention significantly prolongs recalcified plasma clotting time, whereas the lipid derived from brain tissue by the process of Example II actually accelerates recalcified plasma clotting time. Thus, it will be seen that the lipid derived from brain tissue promotes clotting of recalcified plasma, while the lipid of this invention inhibits clotting of recalcified plasma.

*Example VI*

The characterization of the lipid of this invention as preventing thromboplastin generation can be determined by the thromboplastin generation procedure of R. Biggs and A. S. Douglas; Journal of Clinical Pathology, 6, 23 (1953).

In practicing this procedure the lipid preparation is substituted for the "platelet suspension" employed therein. In the standard of this analytical procedure 100% of plasma thromboplastin is generated within a period of five minutes when there is employed the "platelet suspension."

The following represent the results of a comparison of several lipid preparations with "platelet suspension" in this thromboplastin generation test:

When "platelet suspension" was employed in the thromboplastin generation test 100% of thromboplastin generation was obtained within a period of 2 to 5 minutes.

When 0.08 mg. of the lipid preparations obtained by the methods of Example I, Example II and Example III was substituted for the "platelet suspension" in this procedure thromboplastin generation was completely prevented in a period of 5 minutes.

When 0.08 mg. of the lipid derived from brain tissue by the method of Example II was employed in this procedure 100% of thromboplastin generation was obtained within a period of four minutes.

These results demonstrate that the lipid of this invention inhibits thromboplastin generation. On the other hand, the lipid derived from brain tissue according to the procedure of Example II does not inhibit thromboplastin generation, but actually substitutes for "platelet suspension" in promoting thromboplastin generation.

*Example VII*

The following demonstrates that the lipid of this invention counteracts the thromboplastic activity of "platelet suspension" in the thromboplastin generation test described in Example VI.

When "platelet suspension" combined with 0.02 mg. of the lipid preparation obtained in Example II, was employed in this procedure 100% of thromboplastin generation was obtained within a period of two minutes.

When "platelet suspension" combined with 0.04 mg. of the lipid obtained by the method of Example II was employed in this procedure 100% of thromboplastin generation was obtained within a period of four minutes.

When "platelet suspension" combined with 0.1 mg. of the lipid obtained by the method of Example II was employed in this procedure 100% of thromboplastin generation was never achieved.

These results demonstrate that, in the thromboplastin generation test, 0.1 mg. of the lipid of this invention completely counteracts the thromboplastic activity of "platelet suspension," while 0.04 mg. of the lipid of this invention partially counteracts the thromboplastic activity of "platelet suspension," and 0.02 mg. of the lipid of this invention does not provide measurable counteraction of the thromboplastic activity of "platelet suspension."

*Example VIII*

The following procedure demonstrates the characterization of the lipid of this invention as prolonging whole blood clotting time on intravenous injection into rabbits.

The rabbits, numbering 5, were prepared by performing a cutdown of the femoral artery, and introducing a polyethylene tube therein. The rabbits were allowed to recover from surgery overnight.

The lipid obtained by the process of Example I was combined with an isotonic glucose solution to obtain in the resulting aqueous solution 2% of the lipid and 5% of glucose.

The control whole blood clotting time values were obtained by withdrawing three 1 cc. specimens of blood from each of the rabbits, and measuring the coagulation time of such specimens in siliconized test tubes. An average of the three values thus obtained was employed as the control value for each rabbit.

The lipid solution was administered by injection into an ear vein of each rabbit. Ninety minutes after injection three 1 cc. specimens of blood were withdrawn from each rabbit, and the coagulation time of each specimen was measured in a siliconized test tube. The average value for the three specimens was employed as the coagulation time for rabbit after treatment.

The following results were obtained:

| Lipid Dose (mg. per kg. of body weight) | Control Clotting Time (Minutes) | Clotting Time After Treatment with Lipid (Minutes) |
| --- | --- | --- |
| 100 | 42 | 80 |
| 100 | 43 | 94 |
| 100 | 45 | 102 |
| 150 | 29.5 | 98 |
| 300 | 41 | 480 |

These results demonstrate the prolongation of whole blood clotting time by the intravenous injection of the lipid of this invention into rabbits.

*Example IX*

The following demonstrates the prolongation of whole blood clotting time obtained with the lipid of this invention in human blood.

Blood, withdrawn from the antecubital vein of a white male 37 years of age, in the amount of 7 cc., and introduced into a siliconized syringe. This blood was transferred into 7 siliconized test tubes having the dimensions of 12 x 75 mm., 1 cc. per test tube. The test tubes were numbered from 1 to 7.

To each of the tubes numbered 1 to 4 was added 0.02 cc. of isotonic saline. To tube No. 5 was added 0.02 cc. of isotonic saline containing 0.2 mg. of the lipid preparation obtained by the method of Example II. To tube No. 6 was added 0.02 cc. of isotonic saline containing 0.3 mg. of the lipid preparation obtained by the method of Example II. To tube No. 7 was added 0.02 cc. of isotonic saline containing 1.0 mg. of the lipid preparation obtained by the method of Example III.

The coagulation time of the blood in each tube was measured in the manner described by Tocantins in "The Coagulation of Blood," Grune and Stratton, 1955.

The results were as follows:

| Tube Number: | Coagulation time (minutes) |
| --- | --- |
| 1 | 12. |
| 2 | 15. |
| 3 | 16. |
| 4 | 17. |
| 5 | 35. |
| 6 | 45. |
| 7 | Greater than 5 hrs. |

The average of the coagulation time values of the blood in the tubes numbered 2, 3 and 4 represent the control clotting time of this blood.

These results demonstrate that the lipid of this invention prolongs the whole blood clotting time of human blood.

It has been demonstrated that the lipid of this invention is completely soluble in water and remains soluble in water on prolonged storage in aqueous solution. On the other hand, the lipid derived from brain tissue by the procedure of Example II is at least partially insoluble in water, and, upon prolonged storage as an aqueous mixture, there is a progressive increase in the insolubility thereof.

Whereas in the foregoing specification various embodiments of this invention have been described in detail for the purpose of illustration, it will be apparent to those skilled in the art that this invention is susceptible to other embodiments and that many of these details can be varied widely without departing from the basic concept and spirit of the invention.

We claim:

Treatment to obtain in vitro prolongation of whole blood clotting time and an inhibition of thromboplastin generation by administering to a mammal an anti-thromboplastic liver lipid which is substantially non-toxic on oral and intraveneous administration, characterized by being a lipid derived from mammalian liver tissue, by being soluble in water and heptane and insoluble in ethanol, methanol, acetone and a mixture of one part of heptane and three parts of acetone, by prolonging whole blood clotting time, by prolonging recalcified plasma clotting time, by inhibiting thromboplastin generation, by counteracting the thromboplastic activity of platelets, and, upon intravenous injection into rabbits, prolonging whole blood clotting time, said liver lipid being obtainable by non-polar solvent extraction of mammalian liver tissue, followed by organic solvent precipitation of the active lipid.

References Cited in the file of this patent

UNITED STATES PATENTS

| 1,796,027 | Iscovesco | Mar. 10, 1931 |
| 2,494,726 | Sifferd | Jan. 17, 1950 |

OTHER REFERENCES

Dawson: Biochemica et Biophysica Acta, vol. 23, 1957, page 215.

Turner: Archives of Biochemistry and Biophysics, vol. 77, 1958, page 249.